Patented July 4, 1939

2,164,767

UNITED STATES PATENT OFFICE 2,164,767

CHROMIFEROUS DYESTUFFS AND PROCESSES OF PREPARING THEM

Wilhelm Eckert, Frankfort-on-the-Main-Hochst, Germany, assignor to General Aniline Works, Inc., New York, N. Y., a corporation of Delaware No Drawing. Application October 8, 1935, Serial No. 44,127. In Germany October 11, 1934

5 Claims. (Cl. 260—270)

The present invention relates to chromiferous dyestuffs and processes of preparing them.

We have found that chromiferous yellow dyestuffs having very valuable properties may be obtained by treating with an agent yielding chromium the sulfonic or sulfaminic acids of naphthal-aryl imides wherein the aryl imide radical is derived from an amino-salicylic acid which are obtainable according to the processes described in the specifications Nos. 1,796,011, 1,796,012, 1,886,797 and 1,918,461. As such dyestuffs there may be used, for instance, those of the general constitution:

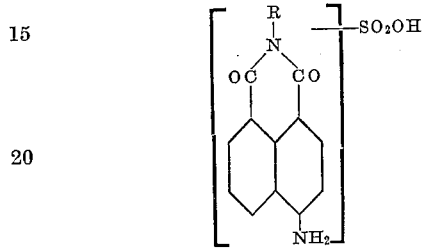

wherein R means the radical of an ortho-hydroxy-carboxylic acid of the benzene series.

The chromiferous dyestuffs which are obtainable according to the present invention possess, besides a very clear greenish-yellow shade, good fastness to washing, fulling, perspiration, sea-water and light, and thereby fulfil a technical requirement.

The dyestuffs may be transformed into chromiferous dyestuffs in known manner by a treatment, for instance, with chromium formate or chromium acetate, chromium fluoride, chromic chloride or the like, by boiling in a reflux apparatus or under pressure.

The following examples illustrate the invention, but they are not intended to limit it thereto, the parts being by weight:

1. 50 parts of the dyestuff of the following constitution:

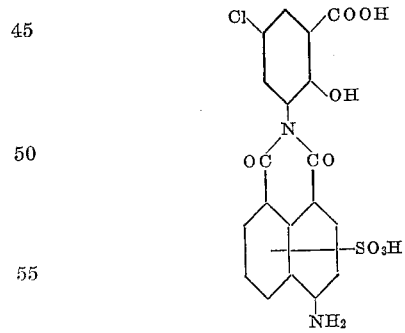

are suspended in 500 parts of water, the reaction being feebly acid to Congo paper; a solution of chromium formate (corresponding with 16 parts of chromium oxide) is added and the whole is boiled for several hours. The dyestuff dissolves gradually with formation of its chromium compound. When the reaction is finished, the dyestuff is isolated in the usual manner, filtered by suction and dried. It forms a yellow powder which is easily soluble in water and yields, for instance on wool, according to the method usually applied with chromiferous dyestuffs, greenish-yellow dyeings of good fastness to washing, fulling, perspiration, sea-water and light.

2. By substituting for the dyestuff used in Example 1 the same amount of the dyestuff of the following constitution:

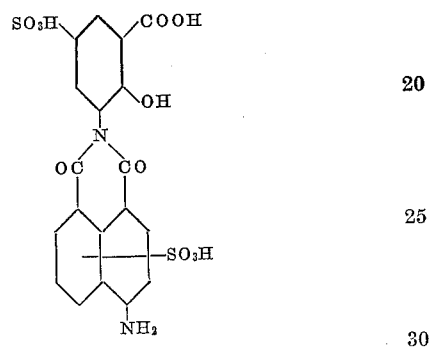

there is obtained a dyestuff of similar fastness and other properties.

3. 50 parts of the dyestuff of the following constitution:

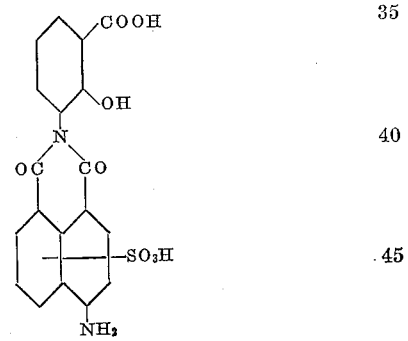

are dissolved in water and sodium carbonate, the sodium salt of the dyestuff being obtained. A solution of chromium fluoride, corresponding with 16 parts of chromium oxide, is added thereto and the whole is heated to boiling until it has become a clear solution. The solution is then evaporated to dryness. A greenish-yellow powder is obtained which yields dyeings of the same fastness and other properties as those of the dyestuff obtained as described in Example 1.

4. By substituting other dyestuffs for those used in the above example; for instance, the dyestuffs of the following constitution:

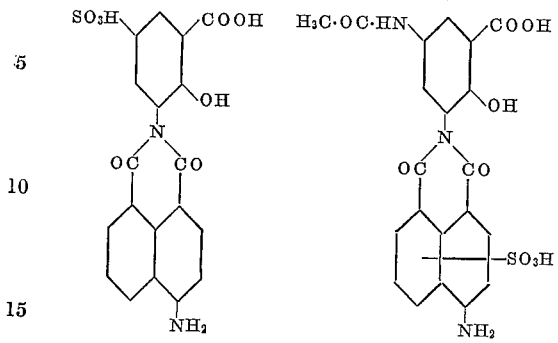

there are obtained chromium compounds of similar properties. The conditions of chroming may also be varied; thus, for instance, the chromium salts specified may be exchanged for other inorganic or organic chromium salts and there may be applied a reduced pressure.

The dyestuffs are distinguished not only by their shades and the fastness properties of their dyeings on animal fibers but they are also very valuable as pigment dyes.

I claim:

1. The chromium complex compounds of the general formula:

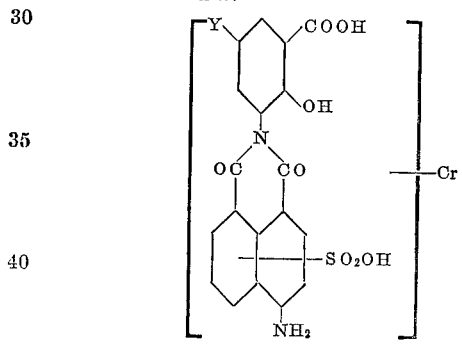

wherein Y is a member of the group consisting of hydrogen, chlorine, sulfonic acid and acetylamino.

2. The chromium complex compound of the formula:

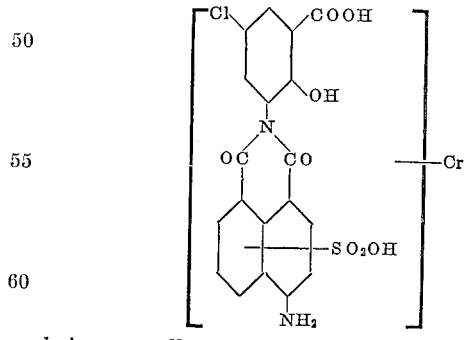

being a yellow powder which is easily soluble in water and yields on wool greenish-yellow dyeings of good fastness to washing, fulling, perspiration, sea-water and light.

3. The chromium complex compound of the formula:

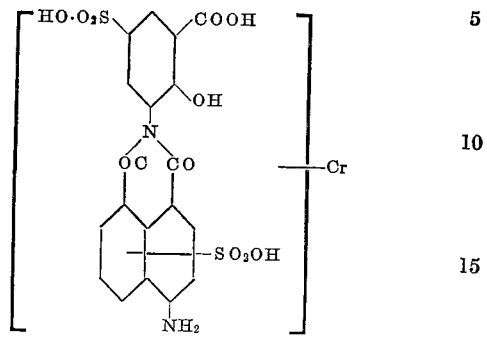

being a powder which is easily soluble in water and yields on wool greenish-yellow dyeings of good fastness to washing, fulling, perspiration, sea-water and light.

4. The chromium complex compound of the formula:

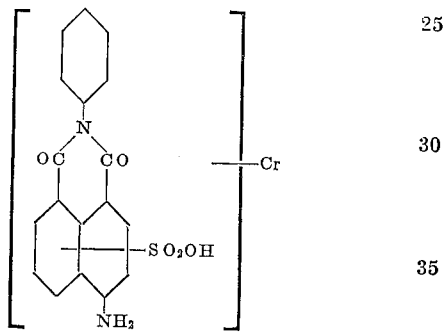

being a greenish-yellow powder which is easily soluble in water and yields on wool greenish-yellow dyeings of good fastness to washing, fulling, perspiration, sea-water and light.

5. The chromium complex compounds of the general formula:

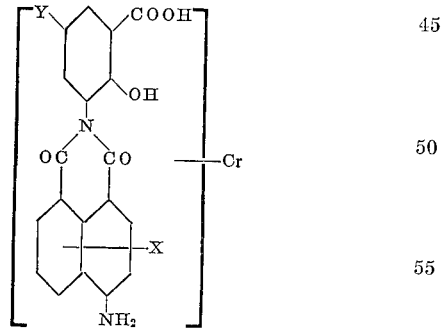

wherein Y is a member of the group consisting of hydrogen, chlorine, sulfonic acid and acetylamino and X is a member of the group consisting of hydrogen and $SO_2OH$.

WILHELM ECKERT.